United States Patent
Horaguchi

(10) Patent No.: US 9,284,140 B2
(45) Date of Patent: Mar. 15, 2016

(54) BELT CONVEYANCE DEVICE, MEDIA CONVEYANCE DEVICE, AND PRINTER

(71) Applicant: Seiko Epson Corporation, Tokyo (JP)

(72) Inventor: Norio Horaguchi, Kamiina-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/584,204

(22) Filed: Dec. 29, 2014

(65) Prior Publication Data

US 2015/0183604 A1 Jul. 2, 2015

(30) Foreign Application Priority Data

Dec. 26, 2013 (JP) ................... 2013-268728

(51) Int. Cl.
| | |
|---|---|
| *B65H 5/02* | (2006.01) |
| *B41J 13/08* | (2006.01) |
| *B65G 23/44* | (2006.01) |
| *B65H 7/02* | (2006.01) |

(52) U.S. Cl.
CPC ............... *B65H 5/021* (2013.01); *B65G 23/44* (2013.01); *B65H 7/02* (2013.01); *B65H 2553/51* (2013.01)

(58) Field of Classification Search
CPC ...... B65H 5/021; B65H 2553/51; B41J 13/08
USPC ................................................. 198/329, 813
See application file for complete search history.

(56) References Cited

U.S. PATENT DOCUMENTS

| | | | | |
|---|---|---|---|---|
| 5,310,173 | A * | 5/1994 | Martinez ...................... | 271/198 |
| 6,158,734 | A * | 12/2000 | Greive et al. ................. | 271/277 |
| 8,474,816 | B2 * | 7/2013 | Ishizaki et al. ................ | 271/270 |
| 9,132,977 | B2 * | 9/2015 | Ueda et al. | |
| 2008/0049054 | A1 * | 2/2008 | Tabata et al. ................. | 346/74.5 |
| 2009/0079999 | A1 * | 3/2009 | Suzuki .......................... | 358/1.1 |
| 2009/0127776 | A1 * | 5/2009 | Dohki ........................... | 271/262 |
| 2009/0195844 | A1 * | 8/2009 | Shiode .......................... | 358/498 |
| 2009/0229954 | A1 * | 9/2009 | Noda et al. ................... | 198/812 |
| 2009/0256309 | A1 * | 10/2009 | Hasegawa ..................... | 271/270 |
| 2012/0237260 | A1 * | 9/2012 | Sengoku et al. ............. | 399/162 |
| 2015/0175374 | A1 * | 6/2015 | Horaguchi | |

FOREIGN PATENT DOCUMENTS

| | | |
|---|---|---|
| JP | 2006-078906 A | 3/2006 |
| JP | 2010-214731 A | 9/2010 |

* cited by examiner

*Primary Examiner* — Patrick Cicchino
(74) *Attorney, Agent, or Firm* — Nutter McClennen & Fish LLP; John J. Penny, Jr.

(57) ABSTRACT

A printer 1 has a belt conveyor mechanism 18 disposed to a platen unit 8 opposite a printhead 7. The belt conveyor mechanism 18 has three conveyor belts 81 mounted on a belt drive roller 82*a* and guide rollers 82*b* to 82*d*. The conveyor belt 81 curves in a C-shape when seen from outside the belt path where the conveyor belt 81 travels around a guide roller 82*c*. Another guide roller 82*d* is positioned outside of the belt path, and contacts the surface (conveyance surface) of the conveyor belt 81 curved in the C-shape. An encoder 84 and inertia member 85A are attached to the rotational shaft 82*e* of the guide roller 82*d*. Another inertia member 85B is attached to the output shaft 83*a* of the conveyor motor 83.

7 Claims, 3 Drawing Sheets

BELT CONVEYANCE DEVICE, MEDIA CONVEYANCE DEVICE, AND PRINTER

Priority is claimed under 35 U.S.C. §119 to Japanese Application No. 2013-268728, which is hereby incorporated by reference in its entirety.

BACKGROUND

1. Technical Field

The present disclosure relates to technology for conveying sheet media by a conveyor belt.

2. Related Art

Some printers, scanners and other devices that print on and read information from sheet media use a belt conveyor mechanism (belt conveyor device) that conveys the media using a conveyor belt mounted on rollers. An image forming apparatus having such a belt conveyor mechanism is taught in JP-A-2006-78906. The image forming apparatus taught in JP-A-2006-78906 transfers a toner image formed on a photoconductor to an intermediate transfer belt to form a color image on the print medium. The intermediate transfer belt is mounted on three rollers, including two pulleys and a belt conveyor drive roller. The color image is transferred from the intermediate transfer belt to paper held and conveyed between one of the two pulleys and a secondary transfer drive roller.

When conveying the medium with a belt conveyor mechanism for printing, the control unit desirably stabilizes the conveyance speed and controls media conveyance with high precision in order to assure the desired printing precision. To prevent a drop in the precision of the image transfer position from the intermediate transfer belt, JP-A-2006-78906 describes the control unit measuring the surface speed of the intermediate transfer belt with an encoder to control rotation of the belt conveyor drive roller. The encoder in JP-A-2006-78906 is disposed to the rotational shaft of a follower roller that contacts the belt surface. The encoder that measures the speed and amount of belt movement in the belt conveyor mechanism can be attached to the rotational shaft of the belt conveyor drive roller, but the speed and amount of belt movement calculated from the encoder signal in this configuration includes error introduced by the thickness of the belt and eccentricity of the encoder, for example. On the other hand, when the encoder is attached to the follower roller in contact with the belt surface to measure the speed and distance of belt travel as taught in JP-A-2006-78906, the speed and distance of belt travel are not easily affected by the belt thickness or the eccentricity of the encoder, for example. The surface speed of the belt can therefore be measured accurately, and high precision conveyance control is possible.

However, the configuration taught in JP-A-2006-78906 disposes the follower roller to contact the horizontal portion of the intermediate transfer belt, and requires providing a follower roller that is separate from the rollers defining the belt path. The parts count increases accordingly. Furthermore, while the pressure must be maintained at a level that does not produce any slipping between the intermediate transfer belt and the follower roller, the conveyance load increases if the pressure is set greater than needed. Initial adjustment of the pressure is therefore required when the follower roller is installed. In addition, because the pressure is affected by change in the belt thickness over time, regular adjustment of the pressure is also needed.

SUMMARY

An objective of the present invention is therefore to provide a mechanism that can be easily installed using a simple configuration of parts and can detect the conveyance distance and conveyance speed of a belt with good precision, and a configuration that can improve conveyance precision, in a belt conveyor device that conveys media by a conveyor belt, and to a printer or other media conveyance device having the belt conveyor device.

To achieve the foregoing objective, a belt conveyor device according to the invention includes a conveyor belt having a conveyance surface that conveys sheet media; a plurality of guide rollers and a belt drive roller on which the conveyor belt is mounted; a conveyance motor that rotationally drives the belt drive roller; and an encoder attached to the rotational shaft of a first guide roller, which is one of the plural guide rollers; wherein the conveyance surface of the conveyor belt is configured to contact the outside surface of the first guide roller.

In this aspect of the invention, one (a first guide roller) of the guide rollers that define the belt path of the conveyor belt contacts the conveyance surface of the conveyor belt, and an encoder is attached to this first guide roller. Providing a separate follower roller to which the encoder is attached is therefore not necessary. Because the first guide roller is reliably pushed to the conveyance surface by the tension of the conveyor belt, careful initial adjustment when installing the first guide roller, and adjustment to account for aging, are not necessary. Movement of the conveyance surface can therefore be measured precisely by means of a configuration having a small parts counts while not requiring regular adjustment. Furthermore, high precision conveyance is possible by controlling the conveyance motor based on encoder signal output.

Further preferably, the conveyance surface of the conveyor belt curves where the conveyor belt is mounted on the first guide roller.

With a belt path having the shape of the belt path thus defined, the angular range of contact between the conveyance surface of the conveyor belt and the outside surface of the first guide roller can be increased. By increasing this angular range, the contact area between the conveyance surface and the outside surface of the first guide roller can be increased. The danger of slipping between the conveyance surface and the outside surface of the first guide roller is therefore small, and movement of the conveyance surface can be accurately measured.

Further preferably, a plurality of conveyor belts are mounted on the plural guide rollers and the belt drive roller.

By using a plurality of conveyor belts, conveyance speed variations due to vibration or slipping with the individual conveyor belts is relieved. The conveyance speed can therefore be stabilized, and the conveyance precision improved.

Yet further preferably, an inertia member is attached to at least one of the output shaft of the conveyance motor and the rotational shaft of the encoder.

When a motor with high torque relative to the conveyance load is used in the belt conveyor mechanism, the conveyance speed may vary according internal torque variation (cogging torque) of the motor, and conveyance precision can drop. By disposing an inertia member to the output shaft of the motor, variation in the rotation of the output shaft due to the cogging torque can be suppressed. By suppressing variation in the rotation of the output shaft, the conveyance speed can be stabilized. Furthermore, while vibration of the conveyor belt or resonance of the rollers on the belt path can occur in the belt conveyor mechanism, variation in rotation of the encoder due to vibration of the belt or roller can be suppressed by disposing an inertia member to the rotary shaft of the encoder. The control unit can therefore precisely measure the conveyance distance and conveyance speed. Based on the result of these measurements, the control unit can control conveyance and improve conveyance precision.

Another aspect of the invention is a media processing device including: a media processing unit that applies a specific process to sheet media; the belt conveyor device described above that conveys the media past a media processing position of the media processing unit; and a control unit that controls the media processing unit and the belt conveyor device; wherein the control unit controls the conveyance motor based on the encoder signal and conveys the media.

Thus comprised, the conveyance distance of the conveyance surface of the conveyor belt can be precisely detected by the encoder. By controlling conveyance based on the encoder signal, the conveyance speed of the medium can be stabilized, and high precision conveyance and media processing can be achieved.

Another aspect of the invention is a printer including: a printhead that prints on sheet media; the media conveyor device described above that conveys the media past the printing position of the printhead; and a control unit that controls the printhead and the media conveyor device; wherein the control unit controls driving the conveyance motor based on the encoder signal and conveys the media.

Thus comprised, movement of the conveyance surface of the conveyor belt can be precisely detected by the encoder. Therefore, by controlling media conveyance based on the encoder signal, the conveyance speed of the medium can be stabilized, and precise conveyance and printing are possible.

Providing a follower roller other than the rollers that define the belt path for attaching an encoder is attached is therefore not necessary with the invention. Because the first guide roller to which the encoder is attached is reliably pressed by the tension of the conveyor belt to the conveyance surface, careful initial adjustment when the first guide roller is installed, and further adjustment to account for aging, are not necessary. A configuration that has few parts, can be easily installed, and does not need periodic adjustment can therefore be used to precisely measure movement of the conveyance surface. Precise conveyance control is also possible by controlling the conveyance motor based on encoder signals. The conveyance speed can also be stabilized by means of such precise conveyance.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer (media conveyance device) having a belt conveyor device according to the present invention is described below with reference to the accompanying figures.

General Configuration

Figure 1:
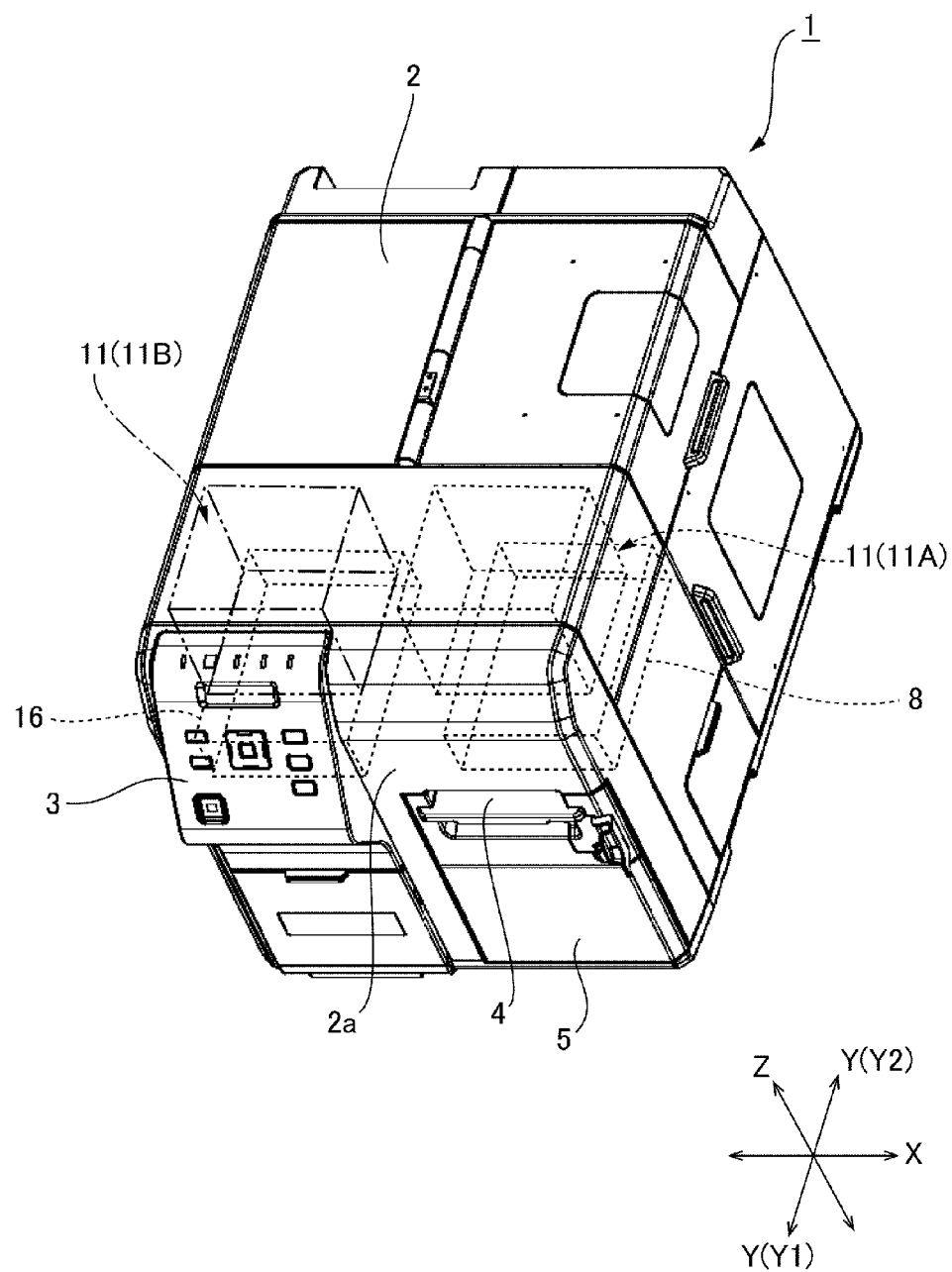
FIG. 1 is an external oblique view of a printer according to the invention.
Figure 2:
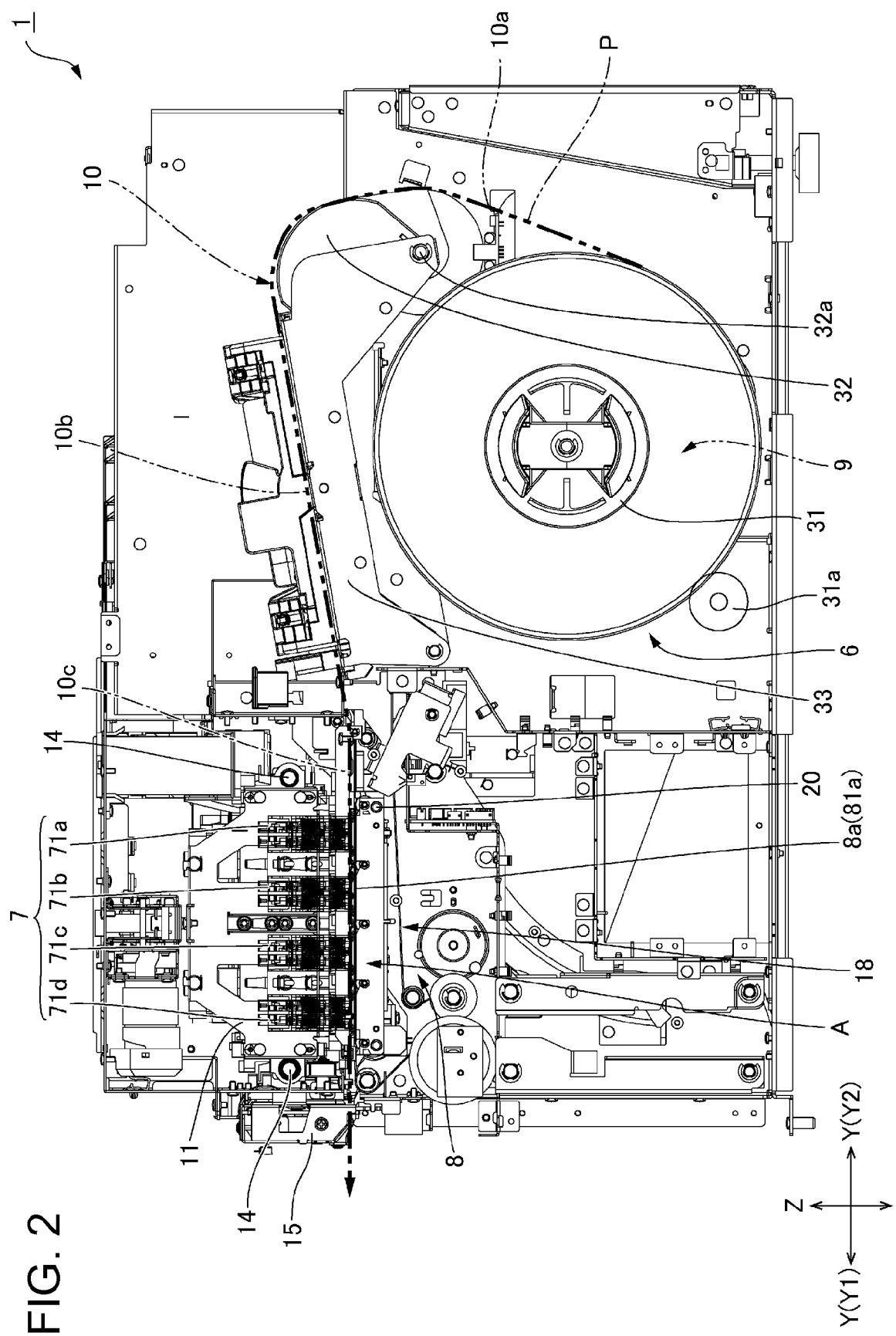
FIG. 2 is a vertical section view showing the internal configuration of the printer in FIG. 1.

FIG. 1 is an external oblique view of a printer according to the invention. FIG. 2 is a vertical section view showing the internal configuration of the printer.

As shown in FIG. 1, the printer 1 has a printer cabinet 2 that is basically box-shaped and is long from front to back. An operating panel 3 is disposed at the top of the front 2a of the printer cabinet 2 on one side of the width, and a paper exit 4 is formed on the other side. An access cover 5 for maintenance is disposed below the paper exit 4.

As shown in FIG. 1, the invention is described below with reference to the three mutually perpendicular directional axes X, Y, and Z, the transverse axis X across the device width, the longitudinal axis Y between the front and back of the device, and a vertical axis Z. Note also that Y1 denotes the front of the printer, and Y2 denotes the back of the printer.

As shown in FIG. 2, a roll paper compartment 6 is formed at the bottom at the printer back Y2 inside the printer cabinet 2. A printhead 7 (media processing unit) is disposed at the top of the printer front Y1, and a platen unit 8 is disposed at the printer front Y1. The printhead 7 is disposed with the nozzle face facing down. The platen unit 8 has a horizontal platen surface 8a opposite the nozzle face of the printhead 7 with a specific gap therebetween.

Inside the printer cabinet 2, the continuous paper P pulled from the paper roll 9 in the roll paper compartment 6 is conveyed through the conveyance path 10 indicated by the imaginary line past the print position where the printhead 7 prints on the medium toward the paper exit 4 opened in the front 2a of the printer cabinet 2, and is discharged from the paper exit 4.

The paper conveyance path 10 includes a first conveyance path section 10a that extends diagonally upward toward the back Y2 from the roll paper compartment 6; a second conveyance path section 10b that curves from the top end of the first conveyance path section 10a toward the front Y1 and descends gradually to the platen surface 8a; and a third conveyance path section 10c that extends horizontally from the back Y2 end of the platen surface 8a to the front Y1 of the printer. The print position A is disposed in the middle of the third conveyance path section 10c.

The printhead 7 is an inkjet line head, and includes four heads, first head 71a, second head 71b, third head 71c, and fourth head 71d. These four heads are narrow and long on the transverse axis X, and are disposed at a regular interval on the longitudinal axis Y. Rows of ink nozzles that eject ink droplets are formed in the nozzle face of each head with a length greater than the maximum width of the recording paper P that can be used. The printhead 7 is mounted on a carriage 11.

A pair of parallel carriage guide rails 14 are disposed extending on the transverse axis X on the opposite sides of the carriage 11 on the longitudinal axis Y. The carriage 11 is supported movably on the transverse axis X by this pair of carriage guide rails 14. A carriage moving mechanism 15 is disposed on the front Y1 side of the carriage 11. The carriage moving mechanism 15 moves the carriage 11 along the pair of carriage guide rails 14 on the transverse axis X.

The carriage 11 moves between the opposing position 11A indicated by the dotted line in FIG. 1, and the standby position 11B indicated by the double-dotted line in FIG. 1.

When the carriage 11 is at the opposing position 11A, the printhead 7 mounted on the carriage 11 is opposite the platen unit 8. When the carriage 11 is at the standby position 11B, the printhead 7 mounted on the carriage 11 is not opposite the platen unit 8. A head maintenance unit 16 is disposed below the standby position 11B, and when the carriage 11 moves to the standby position 11B, the printhead 7 is opposite the head maintenance unit 16.

As shown in FIG. 2, a platen top unit 20 is disposed between the printhead 7 and the platen unit 8. The platen top unit 20 can roll on three ball bearings. The gap (platen gap) between the printhead 7 and the platen unit 8 can be held to a constant distance by setting the carriage 11 and the platen unit 8 in contact with the top and bottom of these three bearings. Note that the platen top unit 20 may be omitted and a constant platen gap maintained by a different platen gap adjustment mechanism. By using this platen top unit 20, however, a star wheel can be mounted on the platen top unit 20. In this configuration, the recording paper P conveyed over the platen surface 8a can be prevented from lifting away from the platen surface 8a by the star wheel.

A roll spindle 31 on which the paper roll 9 is installed is disposed in the roll paper compartment 6. The roll spindle 31 extends on the transverse axis X, and is driven rotationally by drive power from a media supply motor 31a disposed near the bottom of the printer cabinet 2. The paper roll 9 is installed so that it cannot rotate relative to the roll spindle 31, and when the roll spindle 31 turns, the recording paper P is delivered from the paper roll 9 to the first conveyance path section 10a of the conveyance path 10.

A tension lever 32 that applies back tension to the recording paper P is disposed where the conveyance path 10 curves and changes direction from the first conveyance path section 10a to the second conveyance path section 10b. The distal end of the tension lever 32 has a curved outside surface, and the recording paper P is mounted thereon. The tension lever 32 is attached pivotably around a predetermined axis of rotation 32a, and is urged by a spring member (not shown in the figure) to the back Y2.

A paper guide 33 is disposed on the front Y1 side of the tension lever 32, and the second conveyance path section 10b of the conveyance path 10 is defined by the paper guide 33. The paper guide 33 is shaped to descend gently to the front Y1, and guides the recording paper P from the tension lever 32 toward the platen surface 8a. A belt conveyor mechanism 18 (belt conveyor device) that conveys the recording paper P along the platen surface 8a is mounted on the platen unit 8. As described further below, the platen surface 8a comprises the horizontal belt portion 81a of the conveyor belt 81 of the belt conveyor mechanism 18.

Belt Conveyor Mechanism

Figure 3A:
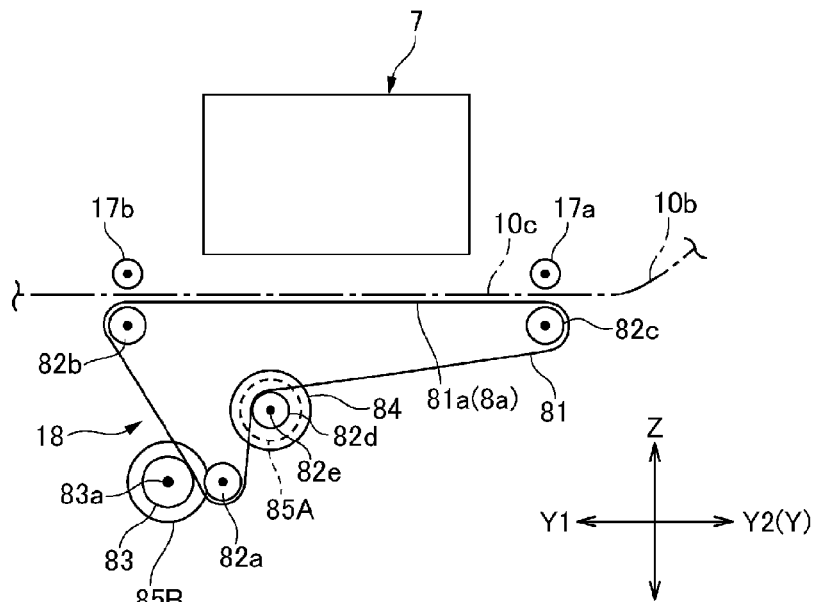
FIGS. 3A and 3B schematically illustrate the paper conveyance mechanism.
Figure 3B:
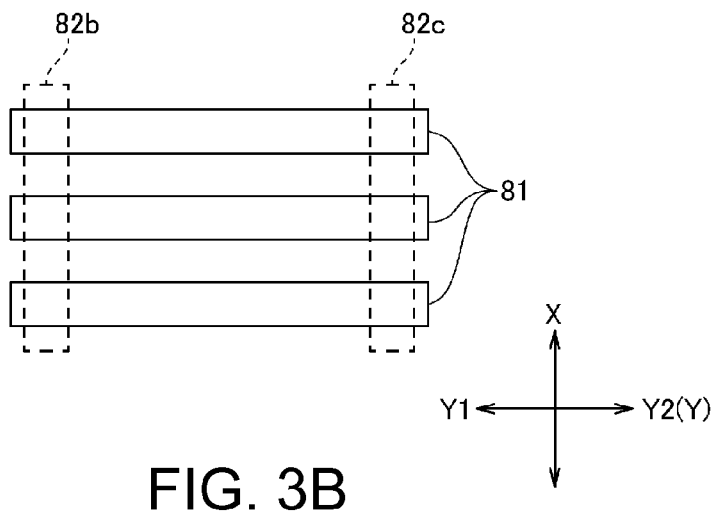

FIGS. 3A and 3B schematically illustrate the belt conveyor mechanism 18, FIG. 3A being a side view of the belt conveyor mechanism 18, and FIG. 3B showing the conveyor belt 81 in plan view. As shown in FIG. 2 and FIG. 3A, the belt conveyor mechanism 18 includes an endless conveyor belt 81 disposed below the third conveyance path section 10c; a belt drive roller 82a and guide rollers 82b to 82d; and a conveyor motor 83 that causes the belt drive roller 82a to turn.

As shown in FIG. 3B, the belt conveyor mechanism 18 includes a plurality of (three in this embodiment) conveyor belts 81. The three conveyor belts 81 are mounted parallel to each other on the belt drive roller 82a and the guide rollers 82b to 82d. By driving the conveyor motor 83 and turning the belt drive roller 82a, the three conveyor belts 81 move along the belt path past the belt drive roller 82a and the guide rollers 82b to 82d. The guide rollers 82b to 82d are supported to rotate freely, and rotate following the three conveyor belts 81 travelling along the belt path.

The portion of the conveyor belt 81 between guide rollers 82b and 82c is the horizontal belt portion 81a extending horizontally over the third conveyance path section 10c. The platen surface 8a is composed of the three horizontal belt portion 81a extending parallel to the longitudinal axis Y. The upstream end and the downstream end of the horizontal belt portion 81a in the conveyance direction (that is, the longitudinal axis Y) is pressed from above the platen unit 8 by the pinch rollers 17a, 17b. The belt conveyor mechanism 18 conveys the recording paper P between the pinch rollers 17a, 17b and the horizontal belt portion 81a.

The belt drive roller 82a and guide rollers 82b, 82c of the belt conveyor mechanism 18 are located inside the closed loop portion of the belt path in contact with the back (inside) side of the conveyor belt 81. The guide roller 82d (first guide roller) is located on the outside of the belt path, and contacts the outside surface of the conveyor belt 81. The outside surface of the conveyor belt 81 faces the printhead 7 in the horizontal belt portion 81a. The conveyor belt 81 and the pinch rollers 17a, 17b hold the recording paper P between the outside surface of the conveyor belt 81 and the outside surface of the pinch rollers 17a, 17b. More specifically, the surface of the conveyor belt 81 that contacts the outside surface of the guide roller 82d is the conveyance surface that conveys the recording paper P.

The guide roller 82d contacts the surface (conveyance surface) of the conveyor belt 81 between the guide roller 82c that defines the upstream end of the horizontal belt portion 81a, and the belt drive roller 82a that is disposed below on the vertical axis Z and to the front Y1 from the guide roller 82c. The guide roller 82d is located above a line connecting the axes of rotation of the belt drive roller 82a and the guide roller 82c. The belt path between the belt drive roller 82a and the guide roller 82c curves where it passes over the guide roller 82d in a C-shape when looking at the belt path from the side as shown in FIG. 3A. The surface (conveyance surface) of the conveyor belt 81 curves in this C-shape around the guide roller 82d, and the conveyor belt 81 winds around the guide roller 82d so that it contacts the outside surface of the guide roller 82d through the angular range corresponding to the angle of curvature of the belt path.

An encoder 84 and an inertia member 85A are attached to the rotational shaft 82e of the guide roller 82d. Another inertia member 85B is attached to the output shaft 83a of the conveyor motor 83. The encoder 84 is a rotary encoder, and the rotational angle and the rotational speed of the rotational shaft 82e are detected based on signal output from the encoder 84. The outside surface of the guide roller 82d contacts the surface of the conveyor belt 81, and rotates following the conveyor belt 81. The distance and speed of movement of the surface (conveyance surface) of the conveyor belt 81 contacting the recording paper P are therefore measured directly by the encoder 84.

The inertia member 85A is a member that increases the inertial moment of rotation in unison with the rotational shaft 82e, and can be configured using a disc of a specific weight attached to the end of the rotational shaft 82e, for example. The inertia member 85B may be a single member or configured from plural members. The inertia member 85B is a member that increases the inertial moment when rotating in unison with the output shaft 83a of the conveyor motor 83, and is configured identically to inertia member 85A.

Control System

Figure 4:
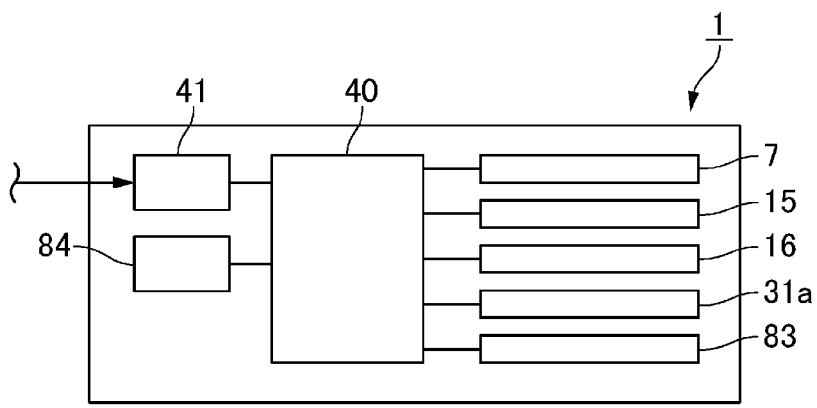
FIG. 4 is a block diagram illustrating the control system of the printer.

FIG. 4 is a block diagram illustrating the control system of the printer 1. The control system of the printer 1 is built around a control unit 40 including a CPU. Connected to the input side of the control unit 40 are a communication unit 41 that communicatively connects a computer or other external device to the printer 1; the encoder 84 of the belt conveyor mechanism 18; a paper detector (not shown in the figure) that detects the recording paper P at a paper detection position of the conveyance path 10; and an encoder (not shown in the figure) that detects the rotational angle of the tension lever 32.

Connected to the output side of the control unit 40 are the printhead 7, carriage moving mechanism 15, head maintenance unit 16, media supply motor 31a, and conveyor motor 83.

As shown in FIG. 2, the recording paper P is pulled from the paper roll 9 loaded in the roll paper compartment 6 to the first conveyance path section 10a of the conveyance path 10, wrapped around the tension lever 32, and this leader is set passing through the second conveyance path section 10b and third conveyance path section 10c.

To print print data supplied from an external device on the recording paper P, the control unit 40 controls driving the media supply motor 31a to turn the roll spindle 31 and feed the recording paper P from the paper roll 9 mounted on the roll spindle 31 to the first conveyance path section 10a. The control unit 40 also controls driving the conveyor motor 83 to drive the belt conveyor mechanism 18. The control unit 40 also controls driving the conveyor motor 83 to execute the indexing operation that positions the leading end of the recording paper P to the print position A (media processing position) of the printhead 7. In this indexing operation, the control unit 40 controls driving the carriage moving mechanism 15 to position the printhead 7 to the opposing position 11A. Next, the control unit 40 controls the belt conveyor mechanism 18 to convey the recording paper P continuously at a constant speed in the forward direction from the print position A toward the paper exit 4. Synchronized to this conveyance operation, the control unit 40 controls driving the printhead 7 to eject ink from the printhead 7 and print on the surface of the recording paper P.

During the indexing operation and the media conveyance operation, the control unit 40 measures the conveyance position of the recording paper P based on output from the paper detector. The control unit 40 measures the conveyance distance of the recording paper P based on the output of the encoder 84 disposed to the rotational shaft 82e of the guide roller 82d. The control unit 40 controls conveyance of the recording paper P based on the measured conveyance position and conveyance distance. During conveyance of the recording paper P, the control unit 40 monitors the conveyance speed of the recording paper P based on the signal output of the encoder 84, and controls conveyance to maintain a constant conveyance speed. The control unit 40 also monitors change in the tension on the recording paper P during conveyance based on the signal output of an encoder that detects the rotational position of the tension lever 32, and controls conveyance to maintain desirable tension. The control unit 40 uses PID control or other feedback control method to maintain a constant conveyance speed and tension.

In a printer 1 according to this embodiment as described above, a guide roller 82d, which is one of plural rollers (belt drive roller 82a and guide rollers 82b to 82d) that define the belt path of the conveyor belt 81, contacts the surface (conveyance surface) of the conveyor belt 81. An encoder 84 is attached to the guide roller 82d, and the control unit 40 measures the conveyance distance and conveyance speed based on signal output from the encoder 84, and based thereon the control unit 40 controls conveyance. Because this configuration directly measures movement of the belt surface (conveyance surface) that contacts and conveys the recording paper P, the control unit 40 can measure the conveyance distance and conveyance speed of the recording paper P with good precision. More specifically, measurement error resulting from the thickness of the conveyor belt, eccentricity of the encoder, and other dimensional and assembly variances are eliminated. Furthermore, because there is no need to provide a follower roller other than the rollers that define the belt path, the parts count is low and a minimal installation space is required in the printer 1.

Furthermore, because the guide roller 82d is pressed to the surface (conveyance surface) of the conveyor belt 81 reliably by the tension of the conveyor belt 81, there is no need for a careful initial adjustment when installing the guide roller 82d, or regular maintenance adjust to account for aging. As a result, the control unit 40 can measure the conveyance distance and conveyance speed with good precision with a configuration having a low parts count and requiring little installation space. Media conveyance can also be precisely controlled by controlling the conveyance motor based on encoder signal output. Printing with high precision is therefore possible.

In this embodiment of the invention, the guide roller 82d to which the encoder 84 is disposed is located above a line between the axes of rotation of the belt drive roller 82a and the guide roller 82c, and the conveyance surface of the conveyor belt 81 curves through a bend where the conveyor belt 81 contacts the guide roller 82d. Thus comprised, the angle of curvature (the angular range through which the conveyor belt 81 contacts the outside surface of the guide roller 82d) of the conveyor belt 81 around the outside surface of the guide roller 82d is large, and the contact area between the conveyor belt 81 and the outside surface of the guide roller 82d is large. The chance of slipping between the conveyor belt 81 and the guide roller 82d is therefore low, and the control unit 40 can accurately measure the movement of the conveyance surface.

Furthermore, the plural conveyor belts 81 in this embodiment of the invention are mounted on the belt drive roller 82a and guide rollers 82b to 82d. Because variations in the conveyance speed due to slipping and vibration of the individual conveyor belts 81 can be alleviated in a conveyance configuration that uses plural conveyor belts 81, the conveyance speed can be stabilized. Conveyance precision can therefore also be improved.

Because the belt conveyor mechanism 18 in this embodiment of the invention is configured so that the contact area with the back of the recording paper P is large, and a conveyor motor 83 with high torque relative to the conveyance load is used, an increase in the internal torque variation (cogging torque) of the motor is possible. However, because the belt conveyor mechanism 18 according to this embodiment has an inertia member 85B disposed to the output shaft 83a of the conveyor motor 83, variation in rotation of the output shaft 83a due to cogging torque can be suppressed. By suppressing rotational variation of the output shaft 83a, the conveyance speed can be stabilized. Furthermore, while vibration of the conveyor belt 81, or resonance of the plural rollers defining the belt path, can occur in the belt conveyor mechanism 18, the belt conveyor mechanism 18 according to this embodiment can suppress change in the rotation of the encoder 84 due to vibration of the conveyor belt 81 or rollers because an inertia member 85A is disposed to the rotational shaft 82e to which the encoder 84 is attached. The control unit 40 can therefore precisely measure the conveyance distance and conveyance speed. By controlling the conveyance motor based on such measurements, conveyance precision can also be improved.

The belt path is defined by the three guide rollers 82b to 82d and the belt drive roller 82a in the belt conveyor mechanism 18 according to this embodiment of the invention, but the number of guide rollers is not limited to three, and there may be four or more.

Furthermore, the belt conveyor mechanism 18 in this embodiment of the invention has three conveyor belts 81, but the number of conveyor belts 81 may be two or less or four or more. Furthermore, an inertia member is disposed to both the output shaft 83a of the conveyor motor 83 and the rotational shaft 82e of the encoder 84, but either one of the inertia members may be omitted.

The foregoing embodiment describes the invention as applied to an inkjet line printer, but the invention can obviously also be applied to a serial printer, for example. The belt conveyor mechanism according to the invention can also be applied to other types of media processing devices that convey a process medium and apply a specific process to the medium. For example, the invention can also be applied to media processing devices such as scanners, fax machines, and photocopiers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A belt conveyor device comprising:
a conveyor belt having a conveyance surface that conveys sheet media;
a plurality of guide rollers and a belt drive roller on which the conveyor belt is mounted, each of the guide rollers and the belt drive roller having an axis of rotation;
a conveyance motor that rotationally drives the belt drive roller; and
an encoder attached to the rotational shaft of a first guide roller, which is one of the plural guide rollers;
wherein a first portion of the conveyance surface of the conveyor belt contacts the outside surface of the first guide roller;
wherein the first guide roller is positioned above a line extending between the axes of rotation of the belt drive roller and a second guide roller of the plural guide rollers, and the second guide roller is positioned above axes of rotation of the belt drive roller and the first guide roller;
wherein the second guide roller is positioned downstream of the first guide roller in a transport direction that is defined by a rotational direction of the belt drive roller, and there are no guide rollers positioned in between the first guide roller and the second guide roller in the transport direction.

2. The belt conveyor device described in claim 1, wherein:
a second portion of the conveyance surface of the conveyor belt curves where the conveyor belt is mounted on the first guide roller.

3. The belt conveyor device described in claim 1, wherein:
a plurality of conveyor belts are mounted on the plural guide rollers and the belt drive roller.

4. The belt conveyor device described in claim 1, wherein:
an inertia member is attached to at least one of the output shaft of the conveyance motor and the rotational shaft of the encoder.

5. A media processing device comprising:
a media processing unit that applies a specific process to sheet media;
the belt conveyor device described in claim 1 that conveys the media past a media processing position of the media processing unit; and
a control unit that controls the media processing unit and the belt conveyor device;
wherein the control unit is configured to control the conveyance motor based on the encoder signal and conveys the media.

6. A printer comprising:
a printhead that prints on sheet media;
the belt conveyor device described in claim 1 that conveys the media past the printing position of the printhead; and
a control unit that controls the printhead and the belt conveyor device;
wherein the control unit is configured to control driving the conveyance motor based on the encoder signal and conveys the media.

7. The belt conveyor device described in claim 1, further comprising first and second pinch rollers disposed above the plurality of guide rollers.

* * * * *